United States Patent [19]

Hasuike

[11] Patent Number: 4,819,798

[45] Date of Patent: Apr. 11, 1989

[54] MULTIPLE CONTAINER

[75] Inventor: Makio Hasuike, Milan, Italy

[73] Assignee: Seima Italiana SpA, Tolmezzo, Italy

[21] Appl. No.: 169,939

[22] Filed: Mar. 18, 1988

[30] Foreign Application Priority Data

Jul. 21, 1987 [IT] Italy .................... 60409/87[U]

[51] Int. Cl.$^4$ ............. B65D 85/57; B65D 85/672
[52] U.S. Cl. .................. 206/309; 206/387;
206/444; 312/8; 312/12
[58] Field of Search .............. 190/108–111;
206/307, 309, 311, 313, 387, 425, 444, 472;
211/40, 71; 312/8, 9, 12

[56] References Cited

U.S. PATENT DOCUMENTS

| | | | |
|---|---|---|---|
| 2,226,976 | 12/1940 | Leaming | 206/425 |
| 3,370,701 | 2/1968 | Van Acker et al. | 206/425 |
| 3,974,898 | 8/1976 | Tullis et al. | 190/108 |
| 4,122,925 | 10/1978 | Schultheiss | 190/108 |
| 4,223,787 | 9/1980 | Lowry et al. | 206/387 |
| 4,266,834 | 5/1981 | Ackeret | 312/12 |
| 4,493,417 | 1/1985 | Ackeret | 206/444 |
| 4,629,066 | 12/1986 | Howard | 206/387 |
| 4,709,815 | 12/1987 | Price et al. | 206/387 |
| 4,744,463 | 5/1988 | Merzon | 206/387 |

FOREIGN PATENT DOCUMENTS

| | | | |
|---|---|---|---|
| 2610832 | 9/1977 | Fed. Rep. of Germany | 206/387 |
| 2807241 | 8/1979 | Fed. Rep. of Germany | 206/425 |
| 2187168 | 9/1987 | United Kingdom | 206/387 |

Primary Examiner—Jimmy G. Foster
Attorney, Agent, or Firm—Flynn, Thiel, Boutell & Tanis

[57] ABSTRACT

Multiple container (10) suitable to hold computer disks, compact-disks, video and audio cassettes and various documents and comprising an outer case (11) open on one side and having a substantially parallelepipedal form, the multiple container (10) having modular dimensional measurements enabling a plurality of such containers to be fitted together, at least one independently usable attaché case (12) being lodged within such outer case (11).

7 Claims, 3 Drawing Sheets

MULTIPLE CONTAINER

This invention concerns a multiple container for various uses. To be more exact, the invention concerns a container suitable to hold disks of various sizes, loose or bundled documents, etc. in a classified or random manner, the container comprising an independent attacheé case for containment and transport purposes.

Multi-purpose containers of such a type are not known.

According to the invention an outer case is provided with one or more attacheé cases which can hold within them one or more replaceable inner containers equipped in an organized manner.

The outer case has modular dimensions and can be stored by being superimposed on another outer case or superimposed on and positioned side by side with other outer cases or else be stored individually.

The attaché cases can be opened along their vertical lengthwise axes so as to form two half attaché cases, and a handle is provided advantageously at the front of the attacheé case so as to facilitate handling operations.

A suitable clamping and fixture push button is comprised which can be operated with the thumb alone.

The attaché cases cooperate with guides inside the outer case for their correct positioning.

The invention is therefore embodied with a multipurpose container according to the contents of the main claim or the secondary claims.

The attached figures, which are given as a non-restrictive example, show the following FIG. 1 gives a three-dimensional view of a multiple container with two attaché cases;

Figure 2:
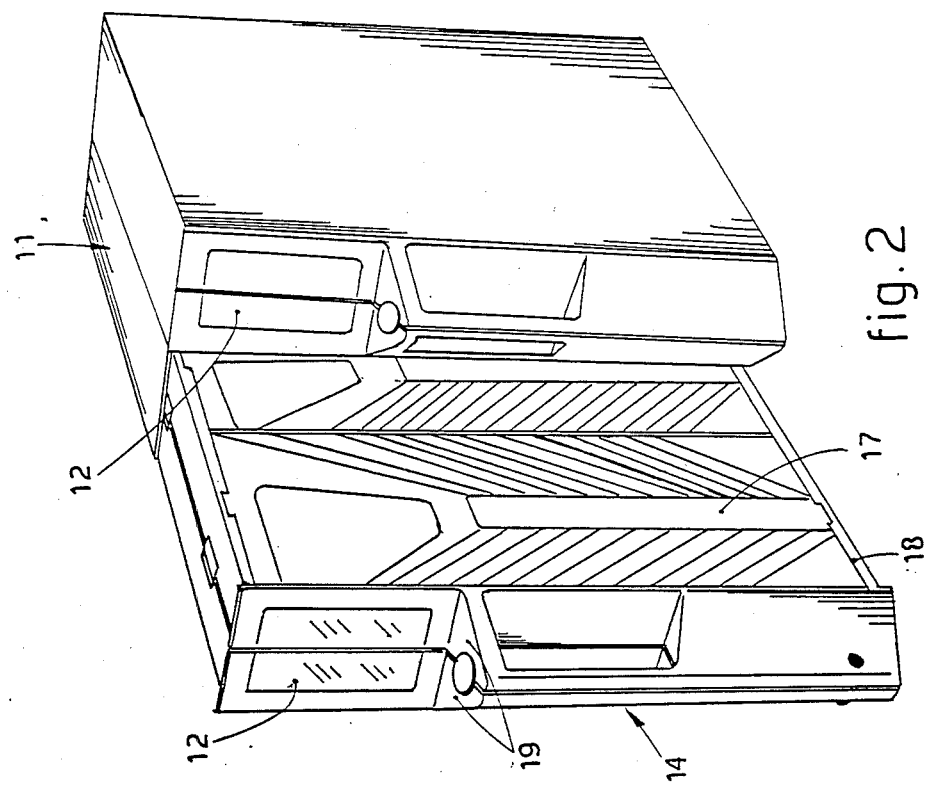
FIG. 2 shows the container of FIG. 1 with one attaché case pulled out.
Figure 1:
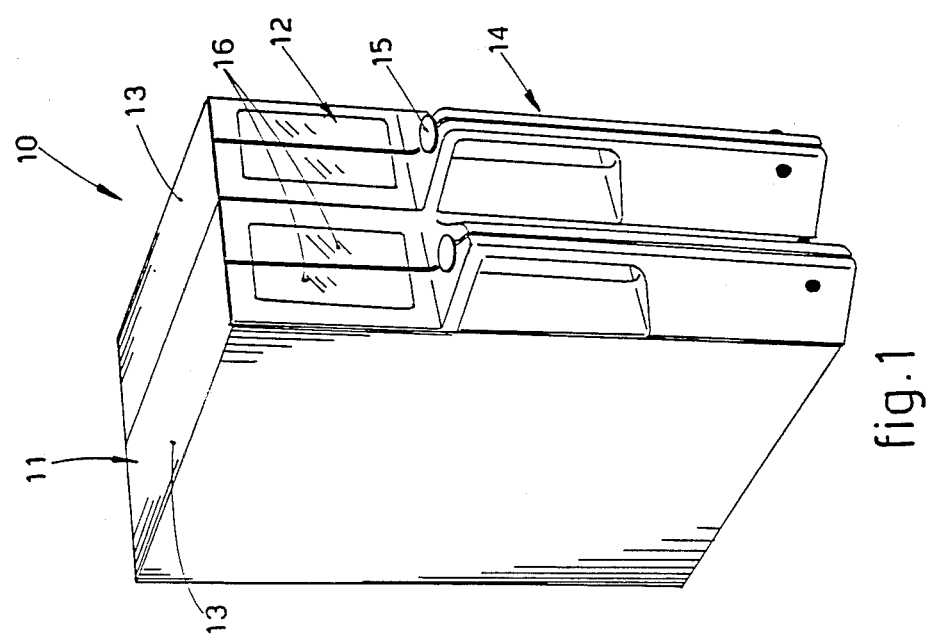
Figure 3:
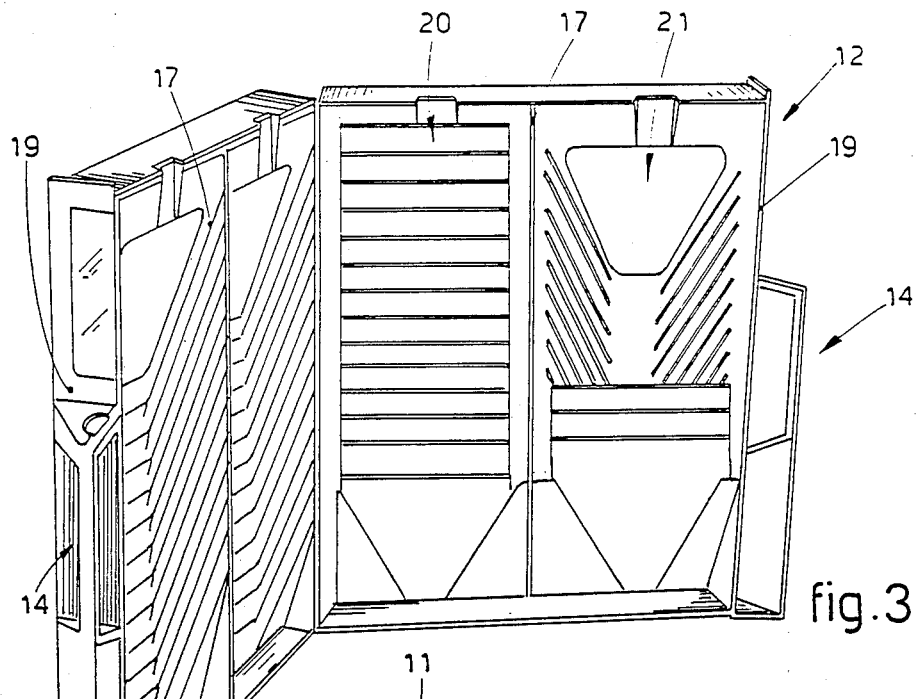
FIG. 3 shows an opened attaché case.
Figure 4:
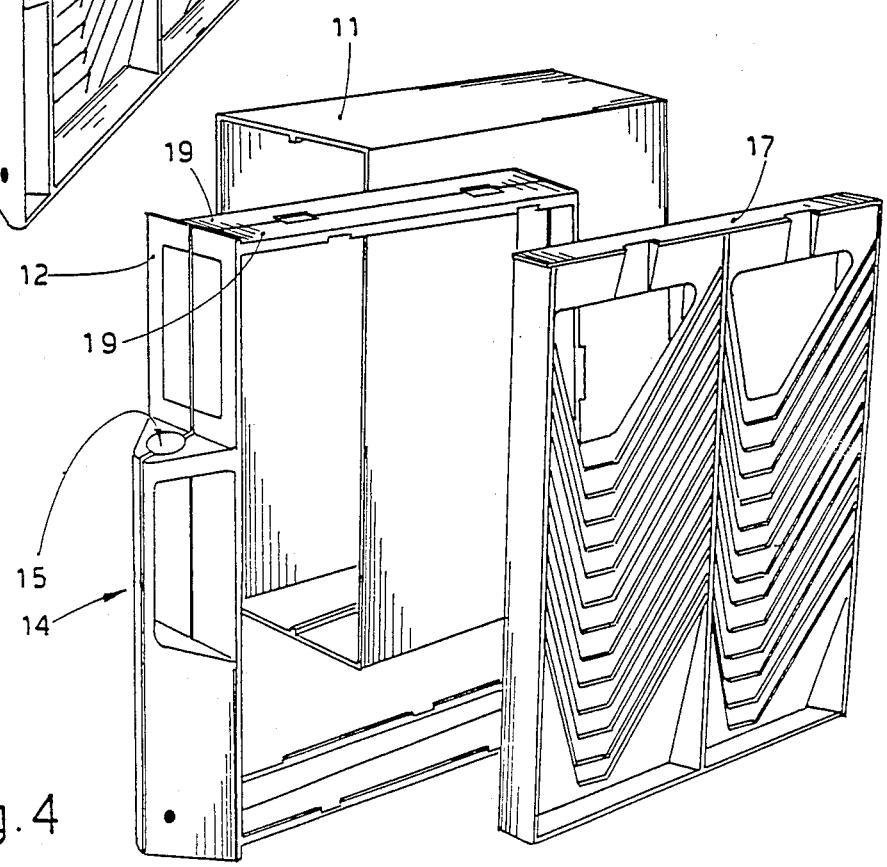
FIG. 4 shows an attaché case, an outer case and an inner organized container separately.

In the figures a multiple container 10 consists of an outer case 11 within which at least one attaché case 12 can be correctly located.

The attaché case 12 can be used independently, that is to say, separately from the outer case 11, which can be positioned vertically or horizontally.

Two or more outer cases 11 can be placed one on another or be positioned side by side, or else some of them can be placed one on another while others are positioned side by side.

Suitable slider clips can clamp the outer cases 11 when the latter are combined together to form a three-dimensional structure.

The outer cases 11 have a base which is a module of their height when the outer case 11 is positioned vertically.

The outer case 11 comprises two combinable half-cases 13 and is able to contain and guide the attaché cases 12 within itself.

Each attaché case 12 comprises a body 18 embodied with two half-bodies 19 obtained on a medium lateral lengthwise plane and hinged together at their rear at 23.

One or more organized inner containers 17 may be located within the half-bodes 19; advantageously there will be one organized inner container 17 for each half-body 19.

Each of the half-bodies 19 comprises at its front a half-handle. The half-handles, when joined together, form a handle 14 and a clamping push button 15 which can be actuated by the thumb of one hand alone.

On their front side the half-bodies 19 comprise identification windows 16 to which are applied lists of the contents and in which it is possible to read what the attaché case contains.

Figure 5:
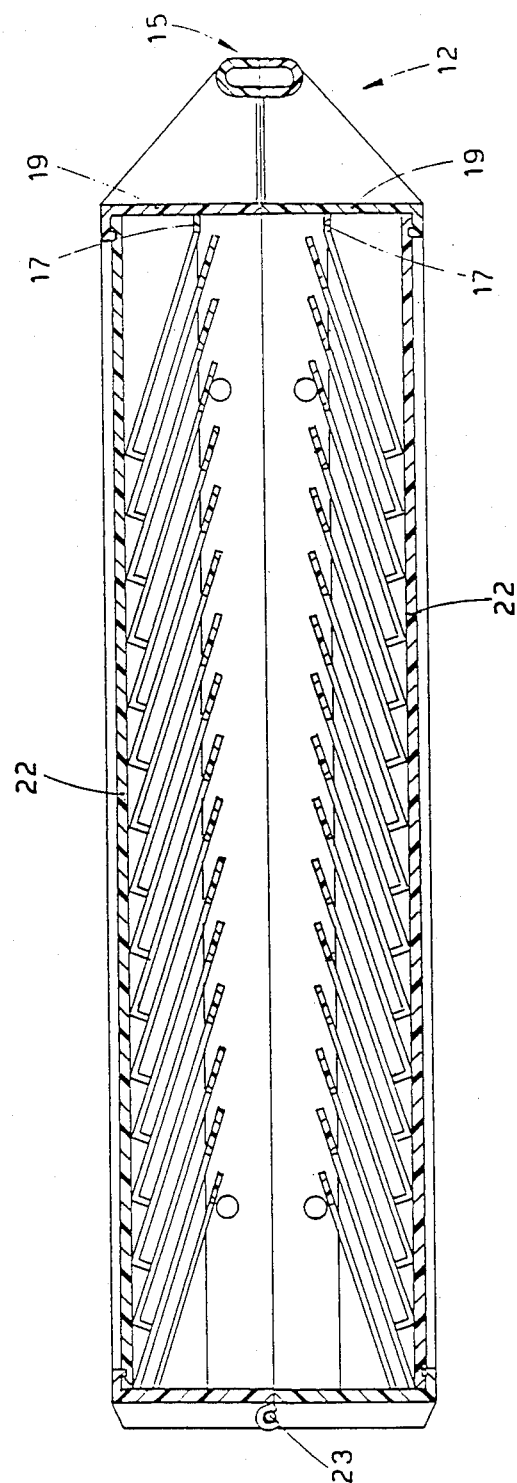
FIG. 5 shows a vertical cross section of an attaché case according to the invention.

As we said above, each of the half-bodies 19 may contain at least one organized inner container 17, or else the half-bodies 19 may be merely closed by a lateral cover 22, which can be of a removable type, as shown in FIG. 5, or of a fixed type.

If the lateral cover 22 is of a fixed type, it will form a continuity of the perimetric edge and may be in a more inward or more outward position, or in the same position, in relation to the perimetric edges.

If removable, the lateral cover 22 may be transparent or not transparent or may not be present, being suitable for application or not according to the user's requirements.

The equipped inner container 17 will advantageously possess an organization of its contents with the inclusion of tiers of horizontal pockets for cards 20, sets of tiers of pockets for disks 21 or one single set of tiers of pockets for disks 21 where disks of a considerable size have to be positioned.

One or more sets of tiers of pockets 21 for disks may be included to suit the type and dimensions of the disks.

The sets of pockets shown in FIG. 5 provide advantageously inclined deep pockets which, if disks are held therein, may comprise a positive V-shaped engagement lead-in (cutaway in the middle) or a negative V-shaped engagement lead-in (cutaway at the sides).

I claim:

1. Multiple container suitable to hold computer disks, compact-disks, video and audio cassettes and various documents and comprising an outer case open on one side and having a substantially parallelepipedal form and at least one independently usable attache case removably lodged within such outer case, the attache case comprising two half-bodies facing each other lengthwise and hinged together at their rear, each half-body comprising a lateral cover, in which the lateral cover is replaceable and removable.

2. Mutliple container suitable to hold computer disks, compact-disks, video and audio cassettes and various documents and comprising an outer case open on one side and having a substantially parallelepipedal form and at least one independently usable attache case removably lodged within such outer case, the attache case comprising two half-bodies facing each other lengthwise and hinged together at their rear, in which a half-body contains at least one replaceable, removable, organized inner container.

3. Multiple container as claimed in claim 2, in which the organized inner container comprises deep, inclined pockets.

4. Multiple container as claimed in claim 2, in which the organized inner container comprises pockets having a V-shaped engagement lead-in.

5. Multiple container suitable to hold computer disks, compact-disks, video and audio cassettes and various documents, and comprising:

a rectangular, outer case having two relatively wide side walls spaced by three narrower edge walls, said outer case having its fourth, front edge open; and at least one independently usable attache case removably lodged within such outer case with only the front edge wall of the attache case exposed, the attache case comprising two half-bodies facing each other lengthwise and hinged together at their rear, the attached cases having at its front a handle defined by two opposed half-handles on the front of the two half-bodies respectively, the front edge wall of the attache case being divided into three approximately equal-length parts, namely:

a. a tent-shaped bottom part, namely of inverted V-shaped cross-section, split along the ridge line to form half-parts on the respective half-bodies, b. a middle part upwardly continuing the shape of the tent-shaped bottom part but cross penetrated by a hand opening to form said handle, and c. a flat top part above the handle and defined by two substantially coplanar half-parts on the respective half-bodies, the flat top part comprising respective coplanar identification windows for displaying a list of the contents of the attache case, the top end of the handle sloping up and inward toward said flat top part and therewith forming a convenient thumb rest for the hand of the user along the joinder of the two half-bodies, the tent-shaped bottom and middle parts of said attache case front wall protruding forwardly out from the open front edge of said multiple container, said windows being visible from the front of said container, said multiple container being of width sufficient to receive at least two said attache cases in side-by-side relation, the tent shape of said bottom part and handle defining a V-shaped valley between handles of side-by-side attache cases in said multiple container to facilitate insertion of the hand of the user into the hand opening of the handle of a given said attache case in said multiple container to facilitate removal of said attache case from said multiple container.

6. Multiple container as claimed in claim 5, in which the attache case comprises a push button located at said two half-handles for clamping together the two half-bodies of the attache case.

7. Multiple container as claimed in claim 5, in which each half-body comprises a lateral cover.

* * * * *